(12) United States Patent
Kobayashi et al.

(10) Patent No.: US 11,332,629 B2
(45) Date of Patent: May 17, 2022

(54) CURABLE CLEAR INK COMPOSITION, STORING CONTAINER, INK SET, PRINTING METHOD, PRINTED MATTER, AND CURED MATERIAL

(71) Applicant: RICOH COMPANY, LTD., Tokyo (JP)

(72) Inventors: Hiroki Kobayashi, Kanagawa (JP); Satoshi Kojima, Kanagawa (JP); Takayuki Shimizu, Kanagawa (JP); Shin Hasegawa, Tokyo (JP); Yukiko Ishijima, Tokyo (JP); Yuuki Matsushita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/745,432

(22) Filed: Jan. 17, 2020

(65) Prior Publication Data

US 2020/0231830 A1   Jul. 23, 2020

(30) Foreign Application Priority Data

Jan. 22, 2019 (JP) .............................. JP2019-008193

(51) Int. Cl.
| | |
|---|---|
| *C08F 2/46* | (2006.01) |
| *C08F 2/50* | (2006.01) |
| *C08G 61/04* | (2006.01) |
| *C09D 11/101* | (2014.01) |
| *C08F 220/18* | (2006.01) |
| *B41M 7/00* | (2006.01) |
| *C08K 5/5397* | (2006.01) |
| *C08L 33/06* | (2006.01) |
| *C08L 75/04* | (2006.01) |
| *C08L 83/04* | (2006.01) |
| *C09D 11/40* | (2014.01) |

(52) U.S. Cl.
CPC ......... *C09D 11/101* (2013.01); *B41M 7/0018* (2013.01); *C08F 220/1811* (2020.02); *C08K 5/5397* (2013.01); *C08L 33/068* (2013.01); *C08L 75/04* (2013.01); *C08L 83/04* (2013.01); *C09D 11/40* (2013.01); *C08L 2312/06* (2013.01)

(58) Field of Classification Search
CPC ....... C09D 11/40; C09D 11/101; C09D 11/38; C08L 75/04; C08L 33/068; C08L 83/04; C08L 2312/06; C08F 220/1811; B41M 7/0018; C08K 5/5397
USPC ....................... 522/6, 189, 184, 1, 71; 520/1
See application file for complete search history.

(56) References Cited

U.S. PATENT DOCUMENTS

| | | | |
|---|---|---|---|
| 2013/0002773 A1 | 1/2013 | Fujii et al. | |
| 2013/0206092 A1 | 8/2013 | Pottiez et al. | |
| 2013/0260092 A1* | 10/2013 | Araki | C09D 11/30 428/137 |
| 2013/0295342 A1 | 11/2013 | Araki et al. | |
| 2015/0344709 A1* | 12/2015 | Araki | B29C 37/0032 428/195.1 |
| 2016/0312052 A1* | 10/2016 | Cong | C09D 11/38 |
| 2017/0043593 A1 | 2/2017 | Steert | |
| 2017/0253680 A1 | 9/2017 | Yamada | |
| 2017/0260405 A1 | 9/2017 | Kumai et al. | |
| 2017/0267879 A1 | 9/2017 | Kohzuki et al. | |
| 2017/0327705 A1 | 11/2017 | Yamada | |
| 2018/0079919 A1 | 3/2018 | Steert et al. | |
| 2018/0170061 A1 | 6/2018 | Nakamura et al. | |
| 2018/0208783 A1 | 7/2018 | Takahashi et al. | |
| 2018/0312707 A1* | 11/2018 | Wang | C08F 220/38 |
| 2018/0333909 A1 | 11/2018 | Arita et al. | |
| 2019/0023924 A1 | 1/2019 | Yamada | |
| 2019/0100667 A1 | 4/2019 | Miyaake et al. | |
| 2019/0256727 A1 | 8/2019 | Kumai et al. | |
| 2019/0270901 A1 | 9/2019 | Fujii et al. | |
| 2019/0270903 A1 | 9/2019 | Kohzuki et al. | |
| 2019/0284416 A1 | 9/2019 | Asami et al. | |
| 2019/0300731 A1 | 10/2019 | Nagashima et al. | |
| 2020/0010662 A1 | 1/2020 | Hiraoka et al. | |

FOREIGN PATENT DOCUMENTS

| | | |
|---|---|---|
| CN | 102850844 | 1/2013 |
| CN | 103374259 | 10/2013 |
| CN | 106457867 | 2/2017 |
| CN | 107406703 | 11/2017 |
| CN | 108603061 | 9/2018 |
| EP | 2 942 204 A1 | 11/2015 |
| EP | 3 070 130 A1 | 9/2016 |
| JP | 2011177964 | * 9/2011 |

(Continued)

OTHER PUBLICATIONS

Kito et al., JP 2011177964 Machine Translation, Sep. 15, 2011 (Year: 2011).*

(Continued)

*Primary Examiner* — Jessica Whiteley (74) *Attorney, Agent, or Firm* — Grüneberg and Myers PLLC (57) ABSTRACT

A curable clear ink composition is provided. The curable clear ink composition comprises a surfactant, a monofunctional polymerizable compound having a static surface tension of 33 mN/m or less at 25 degrees C. in an amount of 10% by mass or more but 30% by mass or less, an oligomer having a weight average molecular weight (Mw) of 1,000 or more, and an acylphosphine oxide polymerization initiator in an amount of 8% by mass or more but 12% by mass or less.

17 Claims, 3 Drawing Sheets

(56) References Cited

FOREIGN PATENT DOCUMENTS

| JP | 2013-067770 | 4/2013 |
| JP | 2013163740 | 8/2013 |
| JP | 2014-084415 | 5/2014 |
| WO | WO 2011/104913 A1 | 9/2011 |

OTHER PUBLICATIONS

Extended European Search dated May 28, 2020 in corresponding European Patent Application No. 20152997.1, 7 pages.
Chinese Office Action dated in Chinese Application No. 202010050025.8, 8 pages.
Flexible printing, Sep. 30, 2016, with English translation, 7 pages.
Notification and Submission of Publication dated Mar. 1, 2022 in Japanese Application No. 2019-008193 with English translation, 8 pages.

* cited by examiner

CURABLE CLEAR INK COMPOSITION, STORING CONTAINER, INK SET, PRINTING METHOD, PRINTED MATTER, AND CURED MATERIAL

CROSS-REFERENCE TO RELATED APPLICATIONS

This patent application is based on and claims priority pursuant to 35 U.S.C. § 119(a) to Japanese Patent Application No. 2019-008193, filed on Jan. 22, 2019, in the Japan Patent Office, the entire disclosure of which is hereby incorporated by reference herein.

BACKGROUND

Technical Field

The present disclosure relates to a curable clear ink composition, a storing container, an ink set, a printing method, a printed matter, and a cured material.

Description of the Related Art

An inkjet ink composition that is curable through irradiation of active energy rays such as ultraviolet rays, which is hereinafter referred to as an "active energy ray curable inkjet ink composition", dries in a short time, generates no harmful evaporated product to the environment, and hardly causes bleeding on an image, as compared to water-based inkjet ink compositions and solvent-based inkjet ink compositions. Such an active energy ray curable inkjet ink composition is based on an excellent technique because of being able to be printed on various substrates.

The active energy ray curable inkjet ink composition mainly requires color inks for forming an image (mainly, a cyan ink, a magenta ink, a yellow ink, and a black ink), a white ink for enhancing color development of an image printed on transparent media, and a clear ink for protecting the image surface and controlling the image glossiness.

Qualities required for the clear ink include productivity by responding to high-speed printing, and smoothness, hardness, and adhesiveness of a clear coat layer in multi-pass printing.

In order to achieve an excellent image quality and glossiness, to give a good surface state, and to solve problems such as a blocking property and ununiformity of glossiness on a clear ink coat layer, such a clear ink that includes a surfactant and an acylphosphine-oxide-based polymerization initiator that is contained more than 1 time but 10 times or less as a weight ratio relative to color inks has been proposed.

SUMMARY

In accordance with some embodiments of the present invention, a curable clear ink composition is provided. The curable clear ink composition comprises a surfactant, a monofunctional polymerizable compound having a static surface tension of 33 mN/m or less at 25 degrees C. in an amount of 10% by mass or more but 30% by mass or less, an oligomer having a weight average molecular weight (Mw) of 1,000 or more, and an acylphosphine oxide polymerization initiator in an amount of 8% by mass or more but 12% by mass or less.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In accordance with some embodiments of the present invention, a curable clear ink composition is provided that can form a clear coat layer having excellent smoothness, exhibit excellent productivity and discharge stability, and form a cured material excellent in adhesiveness and curing ability.

(Curable Clear Ink Composition)

A curable clear ink composition of the present disclosure includes: a surfactant; a monofunctional polymerizable compound having a static surface tension of 33 mN/m or less at 25 degrees C. in an amount of 10% by mass or more but 30% by mass or less; an oligomer having a weight average molecular weight (Mw) of 1,000 or more; and an acylphosphine oxide polymerization initiator in an amount of 8% by mass or more but 12% by mass or less, and further includes other components if necessary.

In the related art, a clear ink containing an acylphosphine-oxide-based polymerization initiator in an amount of 12% by mass or more does not exhibit sufficient discharge stability when discharged at high frequencies. Such a clear ink that can form a clear coat layer having excellent smoothness and exhibits excellent discharge stability when discharged at high frequencies has not been obtained yet.

The present disclosure can provide a curable clear ink composition that can form a clear coat layer having excellent smoothness, exhibit excellent productivity and discharge stability, and form a cured material excellent in adhesiveness and curing ability, by including a surfactant, a monofunctional polymerizable compound having a static surface tension of 33 mN/m or less at 25 degrees C. in an amount of 10% by mass or more but 30% by mass or less, an oligomer having a weight average molecular weight (Mw) of 1,000 or more, and an acylphosphine oxide polymerization initiator in an amount of 8% by mass or more but 12% by mass or less.

Examples of the curable clear ink composition of the present disclosure include, but are not limited to, thermally curable clear ink compositions and active energy ray curable clear ink compositions, with the curable clear ink composition being more suitably active energy ray curable clear ink compositions.

<Polymerizable Compound>

The curable clear ink composition of the present disclosure includes a polymerizable compound.

The polymerizable compound includes a monofunctional polymerizable compound. A proportion of the monofunctional polymerizable compound in the curable clear ink composition is preferably 50% by mass or more but 90% by mass or less, more preferably 70% by mass or more but 90% by mass or less.

Examples of the monofunctional polymerizable compound include, but are not limited to, monofunctional polymerizable compounds having a static surface tension of 33 mN/m or less at 25 degrees C. and monofunctional polymerizable compounds having a static surface tension of more than 33 mN/m at 25 degrees C.

—Monofunctional Polymerizable Compound Having Static Surface Tension of 33 mN/m or less at 25 Degrees C.—

The monofunctional polymerizable compound having a static surface tension of 33 mN/m or less at 25 degrees C. is not particularly limited and may be appropriately selected depending on the intended purpose. Examples thereof include, but are not limited to, isobornyl (meth)acrylate (static surface tension at 25 degrees C.: 33 mN/m), lauryl (meth)acrylate (static surface tension at 25 degrees C.: 29 mN/m), isodecyl (meth)acrylate (static surface tension at 25 degrees C.: 28 mN/m), isooctyl (meth)acrylate (static surface tension at 25 degrees C.: 28 mN/m), n-octyl (meth)acrylate (static surface tension at 25 degrees C.: 28 mN/m), isobutyl (meth)acrylate (static surface tension at 25 degrees C.: 25 mN/m), isononyl (meth)acrylate (static surface tension at 25 degrees C.: 28 mN/m), n-decyl (meth)acrylate (static surface tension at 25 degrees C.: 28 mN/m), and octyl/decyl (meth)acrylate (static surface tension at 25 degrees C.: 29 mN/m). These may be used alone or in combination. Among them, isobornyl (meth)acrylate is preferable from the viewpoint of achieving increased hardness of the resultant coated film.

A proportion of the monofunctional polymerizable compound having a static surface tension of 33 mN/m or less at 25 degrees C. in the curable clear ink composition is 10% by mass or more but 30% by mass or less, preferably 15% by mass or more but 25% by mass or less. The proportion thereof falling within the range of 10% by mass or more but 30% by mass or less is advantageous because the discharge stability and the hardness of a coated film are excellent.

The static surface tension can be measured using, for example, a static surface tension measuring device.

—Monofunctional Polymerizable Compound Having Static Surface Tension of more than 33 mN/m at 25 Degrees C.—

The monofunctional polymerizable compound having a static surface tension of more than 33 mN/m at 25 degrees C. is not particularly limited and may be appropriately selected depending on the intended purpose. Examples thereof include, but are not limited to, (meth)acryloyl morpholine (static surface tension at 25 degrees C.: 44 mN/m), N-vinylcaprolactam (static surface tension at 25 degrees C.: 40 mN/m), phenoxyethyl (meth)acrylate (static surface tension at 25 degrees C.: 40 mN/m), and cyclic trimethylolpropane formal(meth)acrylate (static surface tension at 25 degrees C.: 36 mN/m). These may be used alone or in combination.

A proportion of the monofunctional polymerizable compound having a static surface tension of more than 33 mN/m at 25 degrees C. in the curable clear ink composition is preferably 50% by mass or more but 70% by mass or.

The static surface tension can be measured using, for example, a static surface tension measuring device.

—Other Polymerizable Monomers—

The curable clear ink composition of the present disclosure may include other polymerizable monomers in addition to the monofunctional polymerizable compound having a static surface tension of 33 mN/m or less at 25 degrees C. and the monofunctional polymerizable compound having a static surface tension of more than 33 mN/m at 25 degrees C.

The other polymerizable monomers applicable are known polymerizable monomers such as (meth)acrylic acid esters. Examples thereof include, but are not limited to, methyl (meth)acrylate, ethyl (meth)acrylate, allyl (meth)acrylate, glycidyl (meth)acrylate, 2-(dimethylamino)ethyl (meth) acrylate, 2-hydroxyethyl (meth)acrylate, 2-butoxyethyl (meth)acrylate, ethylcarbitol (meth)acrylate, cyclohexyl (meth)acrylate, tetrahydrofurfuryl (meth)acrylate, 2-(2-vinyloxyethoxy)ethyl (meth)acrylate, 2-phenoxyethyl (meth) acrylate, 2-hydroxy-3-phenoxypropyl (meth)acrylate, ethylene glycol di(meth)acrylate, diethylene glycol di(meth) acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, neopentyl glycol di(meth)acrylate, ethoxylated neopentyl glycol di(meth)acrylate, propoxylated neopentyl glycol di(meth)acrylate, 1,6-hexanediol di(meth)acrylate, and 1,9-nonanediol di(meth)acrylate. These may be used alone or in combination.

The curable clear ink composition of the present disclosure includes an oligomer having a weight average molecular weight (Mw) of 1,000 or more. Inclusion of the oligomer having a weight average molecular weight (Mw) of 1,000 or more is advantageous because the resultant coated film is excellent in adhesiveness and hardness.

The oligomer is a polymerizable oligomer having an ethylenically unsaturated double bond. Examples thereof include, but are not limited to, aromatic urethane oligomers, aliphatic urethane oligomers, epoxy acrylate oligomers, polyester acrylate oligomers, and other special oligomers.

The oligomer having a weight average molecular weight (Mw) of 1,000 or more may be a commercially available product. Examples of the commercially available product include, but are not limited to: UV-2000B, UV-2750B, UV-3000B, UV-3010B, UV-3200B, UV-3300B, UV-3700B, UV-6640B, UV-8630B, UV-7000B, UV-7610B, UV-1700B, UV-7630B, UV-6300B, UV-6640B, UV-7550B, UV-7600B, UV-7605B, UV-7610B, UV-7630B, UV-7640B, UV-7650B, UT-5449, and UT-5454 (all of which are available from Mitsubishi Chemical Corporation); CN902, CN902J75, CN929, CN940, CN944, CN944B85, CN959, CN961E75, CN961H81, CN962, CN963, CN963A80, CN963B80, CN963E75, CN963E80, CN963J85, CN964, CN965, CN965A80, CN966, CN966A80, CN966B85, CN966H90, CN966J75, CN968, CN969, CN970, CN970A60, CN970E60, CN971, CN971A80, CN971J75, CN972, CN973, CN973A80, CN973H85, CN973J75, CN975, CN977, CN977C70, CN978, CN980, CN981, CN981A75, CN981B88, CN982, CN982A75, CN982B88, CN982E75, CN983, CN984, CN985, CN985B88, CN986, CN989, CN991, CN992, CN994, CN996, CN997, CN999, CN9001, CN9002, CN9004, CN9005, CN9006, CN9007, CN9008, CN9009, CN9010, CN9011, CN9013, CN9018, CN9019, CN9024, CN9025, CN9026, CN9028, CN9029, CN9030, CN9060, CN9165, CN9167, CN9178, CN9290, CN9782, CN9783, CN9788, and CN9893 (all of which are available from SARTOMER); and EBECRYL210, EBECRYL220, EBECRYL230, EBECRYL270, KRM8200, EBECRYL5129, EBECRYL8210, EBECRYL8301, EBECRYL8804, EBECRYL8807, EBECRYL9260, KRM7735, KRM8296, KRM8452, EBECRYL4858, EBECRYL8402, EBECRYL9270, EBECRYL8311, and EBECRYL8701 (all of which are available from Daicel-Cytec Company, Ltd.). These may be used alone or in combination. Among them, CN963, CN964, CN965, and CN996 available from SARTOMER are preferable.

A proportion of the oligomer in the curable clear ink composition is preferably 0.1% by mass or more but 15% by mass or less, more preferably 1% by mass or more but 10% by mass or less.

<Surfactant>

In the present disclosure, the surfactant is a compound having a surface activating ability excluding a so-called "pigment dispersant". Examples of the surfactant include, but are not limited to, amphoteric surfactants, nonionic surfactants, anionic surfactants, fluorine-based surfactants, and polysiloxane surfactants. Among them, polysiloxane surfactants are preferable because they have a high surface activating ability.

Examples of the polysiloxane surfactant include, but are not limited to: compounds having a polysiloxane structure such as polydimethylsiloxane (silicone-based compounds) including a hydrophilic group or a hydrophilic polymer chain in a side chain thereof; and compounds having a polysiloxane structure such as polydimethylsiloxane (silicone-based compounds) including a hydrophilic group or a hydrophilic polymer chain at an end thereof. The polysiloxane surfactant is not particularly limited as long as it has a polysiloxane structure in the structure thereof. What is meant by the polysiloxane surfactant includes polysiloxane-based surfactants as well.

Examples of the hydrophilic group and the hydrophilic polymer chain include, but are not limited to, polyether groups (e.g., polyethylene oxide, polypropylene oxide, and copolymers thereof), polyglycerin (e.g., $C_3H_6O(CH_2CH(OH)CH_2O)_n$—H), pyrrolidone, betaine (e.g., $C_3H_6N^+(C_2H_4)_2$—$CH_2COO^-$), sulfates (e.g., $C_3H_6O(C_2H_4O)_n$—$SO_3Na$), phosphates (e.g., $C_3H_6O(C_2H_4O)_n$—$P(=O)OHONa$), and quaternary salts (e.g., $C_3H_6N^+(C_2H_4)_3Cl^-$). In the aforementioned chemical formulas, n represents an integer of 1 or greater. Among them, polyether groups are preferable.

Other suitable examples thereof include, but are not limited to, vinyl-based copolymers each having a silicone-based compound chain such as polydimethylsiloxane in a side chain thereof, which are obtained by copolymerizing, for example, polydimethylsiloxane having a polymerizable vinyl group at an end thereof with a copolymerizable another monomer (at least part of the monomer preferably includes a hydrophilic monomer such as (meth)acrylic acid or a salt thereof).

Among them, a compound that has a compound having a polysiloxane structure and a hydrophilic polymer chain is preferable. The compound including a polyether group as the hydrophilic polymer chain is more preferable. The polysiloxane surfactant is particularly preferably a nonionic surfactant including methyl polysiloxane as a hydrophobic group and having a polyoxyethylene structure as a hydrophilic group.

Examples of the polysiloxane surfactant include, but are not limited to, polyether-modified silicone compounds and silicone compounds including a polyoxyalkylene group.

The polysiloxane surfactant may be a commercially available product. Examples of the commercially available product include, but are not limited to, TEGO WET270 (available from Evonik), BYK3150 and BYK3151 (both of which are available from BYK Additives & Instruments), SILFACE SAG005 and SILFACE SAG008 (both of which are available from Nissin Chemical Industry Co., Ltd.), FZ2110, FZ2166, SH-3772M, L7001, and SH-3773M (all of which are available from Dow Corning Toray Co., Ltd.), KF-945, KF-6017, and KF-353 (all of which are available from Shin-Etsu Chemical Co., Ltd.), and FormBan MS-575 (available from Ultra Addives Inc.).

A proportion of the surfactant in the curable clear ink composition is preferably 0.01% by mass or more but 1% by mass or less, more preferably 0.05% by mass or more but 0.2% by mass or less.

<Polymerization Initiator>

The curable clear ink composition of the present disclosure may include a polymerization initiator. The polymerization initiator may be referred herein to simply as an initiator. Examples of the polymerization initiator include, but are not limited to, thermal polymerization initiators and photopolymerization initiators.

The photopolymerization initiator may be any photopolymerization initiator as long as it can produce active species such as radicals or cations upon application of energy of active energy rays and can initiate polymerization of polymerizable compounds (monomers or oligomers). As the photopolymerization initiator, a known radical polymerization initiator, a cation polymerization initiator, a base producing agent, and other agents can be used alone or in combination. Among them, a radical polymerization initiator is preferable.

Specific examples of the radical polymerization initiators include, but are not limited to, aromatic ketones, acylphosphine oxide compounds, aromatic onium salt compounds, organic peroxides, thio compounds (e.g., thioxanthone compounds and thiophenyl group-containing compounds), hexaaryl biimidazole compounds, ketoxime ester compounds, borate compounds, azinium compounds, metallocene compounds, active ester compounds, compounds having a carbon halogen bond(s), and alkyl amine compounds.

Among them, an acylphosphine oxide polymerization initiator is particularly preferable.

The acylphosphine oxide polymerization initiator may be a commercially available product. Examples of the commercially available product include, but are not limited to, Omnirad 819 and Omnirad TPO (available from IGM).

A proportion of the acylphosphine oxide polymerization initiator in the curable composition is 8% by mass or more but 12% by mass or less. The proportion of the acylphosphine oxide polymerization initiator falling within the range of 8% by mass or more but 12% by mass or less is advantageous because it is possible to achieve both discharge stability and curing ability when an LED light source is used.

In addition to the polymerization initiator, a polymerization accelerator (sensitizer) can be used in combination. The polymerization accelerator is not particularly limited and may be appropriately selected depending on the intended purpose. Examples thereof include, but are not limited to, amine compounds such as trimethyl amine, methyl dime-thanol amine, triethanol amine, p-diethylamino acetophe-none, ethyl p-dimethylaminobenzoate, 2-ethylhexyl p-dim-ethylaminobenzoate, N,N-dimethylbenzylamine, and 4,4'-bis(diethylamino)benzophenone.

A content of the polymerization accelerator is not particularly limited and may be appropriately set depending on the polymerization initiator to be used and the content thereof.

The curable clear ink composition of the present disclosure is substantially free of a colorant. The curable clear ink composition may be colorless and transparent. When the curable clear ink composition is colorless and transparent, it is suitable as, for example, an overcoat layer for protecting an image.

<Other Components>

The curable clear ink composition of the present disclosure optionally contains other known components. The other known components are not particularly limited and may be appropriately selected depending on the intended purpose. Examples thereof include, but are not limited to, organic solvents, polymerization inhibitors, leveling agents, defoaming agents, fluorescent brighteners, permeation enhancing agents, wetting agents (humectants), fixing agents, viscosity stabilizers, fungicides, preservatives, anti-oxidants, ultraviolet absorbents, chelate agents, pH adjusters, (regulators), and thickeners.

<Organic Solvent>

The curable clear ink composition of the present disclosure optionally contains an organic solvent although it is preferable to spare it. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

Regarding the components in the curable clear ink composition, low-molecular-weight components such as a polymerizable monomer or a polymerization initiator can be identified by, for example, gas chromatogram mass spectrometry. Meanwhile, polymer components can be identified by precipitating and isolating the polymer components in a poor solvent such as methanol and then measuring contents of main segments and chlorine atoms through infrared spectroscopy or elemental analysis.

<Preparation of Curable Clear Ink Composition>

The curable clear ink composition of the present disclosure can be prepared by using the components described above. The preparation devices and conditions are not particularly limited. For example, the curable clear ink composition can be prepared by subjecting a polymerizable compound, a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization inhibitor, and a surfactant.

<Viscosity>

The viscosity of the curable clear ink composition of the present disclosure has no particular limit because it can be adjusted depending on the purpose and application devices. For example, if an ejecting device that ejects the curable clear ink composition from nozzles is employed, the viscosity thereof is 60 mPa·s or less, preferably in the range of 3 mPa·s to 40 mPa·s, more preferably in the range of 5 mPa·s to 30 mPa·s, still more preferably in the range of 5 mPa·s to 15 mPa·s, particularly preferably in the range of 6 mPa·s to 12 mPa·s in the temperature range of 20 degrees C. to 65 degrees C., preferably at 25 degrees C. In addition, it is particularly preferable to satisfy this viscosity range by the composition free of the organic solvent described above. Incidentally, the viscosity can be measured by a cone plate rotary viscometer (VISCOMETER TVE-22L, manufactured by TOKI SANGYO CO., LTD) using a cone rotor (1°34'× R24) at a number of rotation of 50 rpm with a setting of the temperature of hemathermal circulating water in the range of 20 degrees C. to 65 degrees C. VISCOMATE VM-150III can be used for the temperature adjustment of the circulating water.

<Curing Means>

Preferably, the curable clear ink composition is cured by application of heat or irradiation with an active energy ray, and the latter is more preferable.

Specific examples of the active energy ray for curing the curable clear ink composition include, but are not limited to, electron beams, $\alpha$-rays, $\beta$-rays, $\gamma$-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable. A light-emitting diode having a wavelength of 350 nm or more but 450 nm or less (particularly wavelength of 350 nm or more but 400 nm or less) is preferably used.

(Ink Set)

An ink set of the present disclosure includes a clear ink comprising the curable clear ink composition of the present disclosure and a color ink. Such an ink set makes it possible to achieve excellent smoothness of a clear coat layer on a color image.

The color ink is not particularly limited as long as it is substantially free of an N-vinyl compound and a surfactant, and known color inks can be used depending on the intended purpose.

As the color ink, at least one selected from the group consisting of a cyan ink, a magenta ink, a yellow ink, and a black ink is used.

<Application Field>

The application field of the curable clear ink composition of the present disclosure is not particularly limited. It can be applied to any field where active energy ray curable compositions are generally used. For example, the curable clear ink composition is selected to a particular application and used for a resin for processing, a paint, an adhesive, an insulant, a release agent, a coating material, a sealing material, various resists, and various optical materials.

Figure 2:
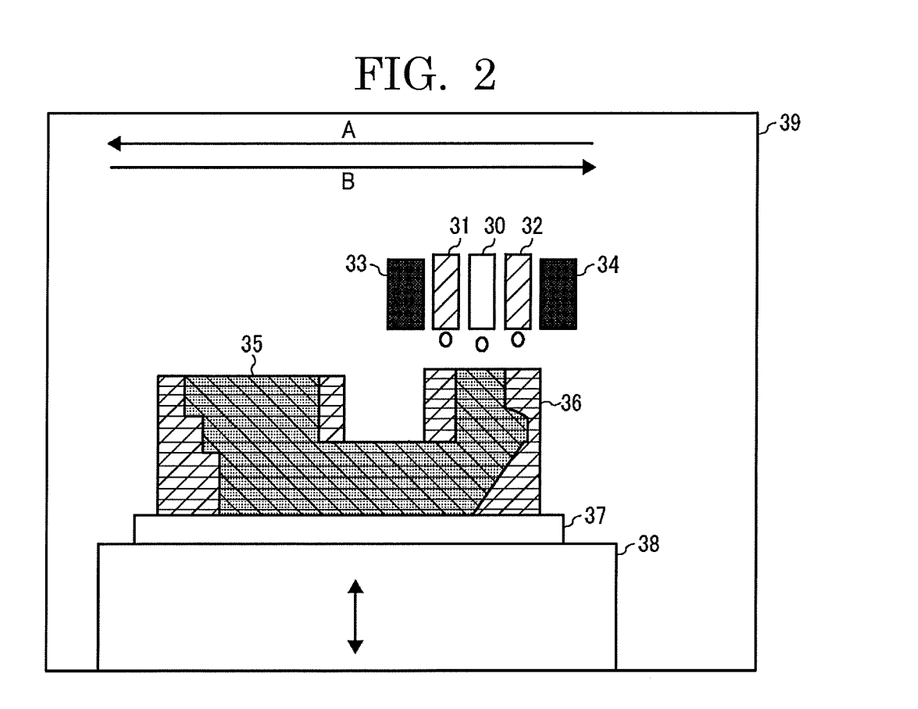
FIG. 2 is a schematic diagram illustrating another image forming apparatus according to an embodiment of the present invention, which is a three-dimensional object forming apparatus.
Figure 3A:
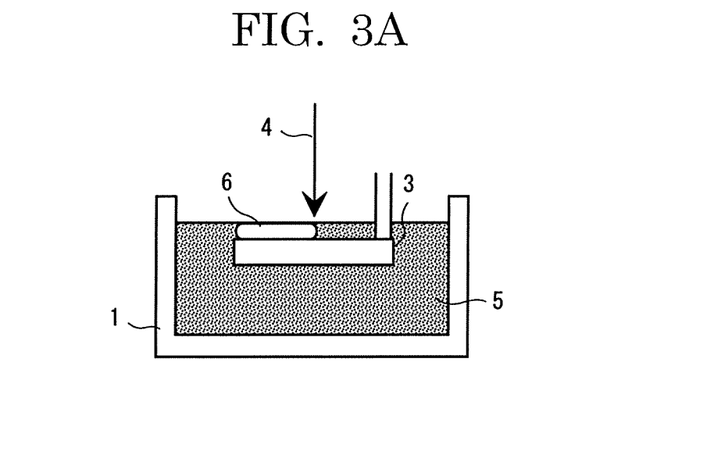
FIGS. 3A to 3D are each a schematic explanatory diagram illustrating a method for performing three-dimensional molding using a curable clear ink composition according to an embodiment of the present invention.
Figure 3B:
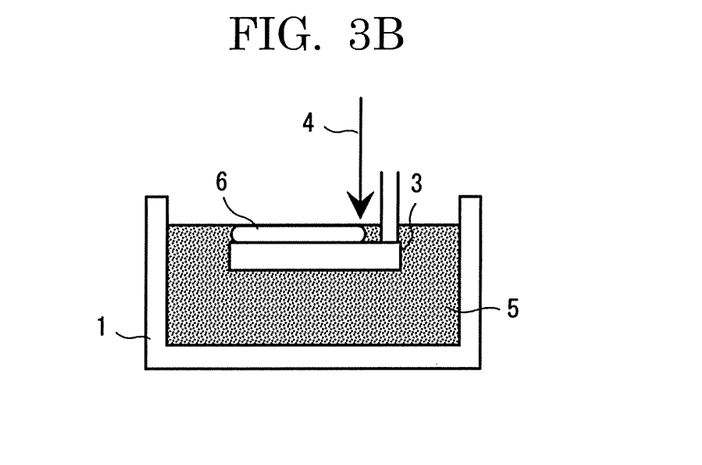
Figure 3C:
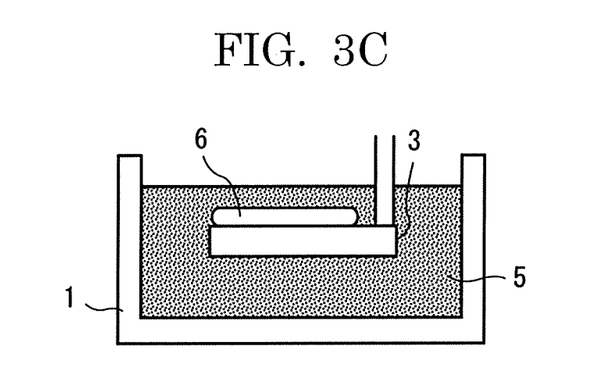
Figure 3D:
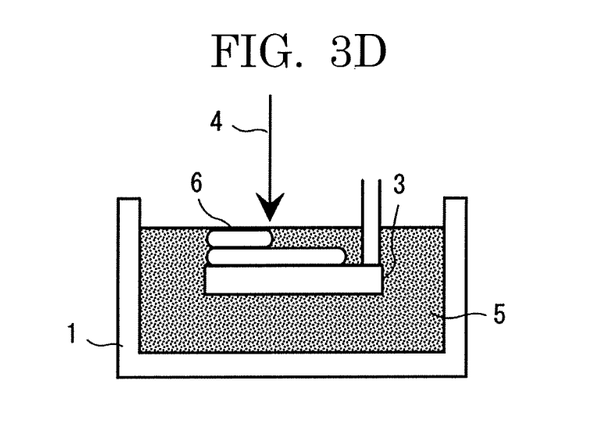

The curable clear ink composition of the present disclosure can be used as an ink to form two-dimensional texts, images, and designed coating film on various substrates and in addition as a solid object forming material to form a three-dimensional object (solid object). This three dimensional object forming material may also be used as a binder for powder particles used in a powder layer laminating method of forming a three-dimensional object by repeating curing and layer-forming of powder layers, and as a three-dimensional object constituent material (a model material) and a supporting member (supporting material) used in an additive manufacturing method (a stereolithography method) as illustrated in FIG. 2, FIG. 3A, FIG. 3B, FIG. 3C, and FIG. 3D. FIG. 2 is a diagram illustrating a method of additive manufacturing to sequentially form layers of the active energy ray curable composition of the present disclosure one on top of the other by repeating discharging the active energy ray curable composition to particular areas followed by curing upon irradiation of an active energy ray (which will be described hereinafter). FIGS. 3A to 3D are each a diagram illustrating a method of additive manufacturing to sequentially form cured layers 6 having respective predetermined forms one on top of the other on a movable stage 3 by irradiating a storing pool (storing unit) 1 of the active energy ray curable composition 5 of the present disclosure with the active energy ray 4.

An apparatus for fabricating a three-dimensional object by the curable clear ink composition of the present disclosure is not particularly limited and can be a known apparatus. For example, the apparatus includes a containing device, a supplying device, and a discharging device of the composition, and an active energy ray irradiator.

In addition, the present disclosure includes cured materials obtained by curing the curable composition and processed products obtained by processing structures having the cured materials on a substrate. The processed product is fabricated by, for example, heat-drawing and punching a cured material or structure having a sheet-like form or film-like form. The processed product can be suitably used for applications where a surface is required to be molded after decoration. Examples thereof include, but are not limited to, gauges or operation panels of vehicles, office machines, electric and electronic machines, and cameras. The substrate is not particularly limited. It can suitably be selected to a particular application. Examples thereof include, but are not limited to, paper, thread, fiber, fabrics, leather, metal, plastic, glass, wood, ceramic, or composite materials thereof. Of these, plastic substrates are preferred in terms of processability.

<Storing Container>

The storing container of the present disclosure contains the curable clear ink composition of the present disclosure and is suitable for the applications as described above. For example, if the curable clear ink composition of the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

(Printing Method)

In a printing method of the present disclosure, an image is printed by discharging the curable clear ink composition of the present disclosure in a droplet size of 10 pL or more but 20 pL or less.

In the printing method, the discharging is preferably performed on the same part of the image to be printed with number of times of scanning being 8 times or less.

The leveling time from when the curable clear ink composition discharged is impacted on a substrate to when the curable clear ink composition impacted is irradiated with active energy rays is preferably 15 seconds or more but 120 seconds or less.

The clear ink composition of the present disclosure is a clear ink composition having such formulation that enables discharge in the form of a large droplet. Therefore, it is possible to perform printing in 8 passes, to level the clear ink composition without UV irradiation during a period of time for 8-pass printing, and to achieve productivity in high-speed printing, excellent smoothness of a clear coat layer in multi-pass printing, hardness, and adhesiveness, which are required for the clear ink.

<Image Forming Method and Image Forming Apparatus>

An image forming method relating to the present disclosure may be performed using an active energy ray and/or while applying heat. The image forming method in accordance with some embodiments of the present invention includes at least an irradiating step of irradiating the curable clear ink composition of the present disclosure with an active energy ray to cure the curable clear ink composition. The image forming apparatus of the present disclosure includes at least an irradiator to irradiate the curable clear ink composition of the present disclosure with an active energy ray and a storing unit containing the curable clear ink composition of the present disclosure. The storing unit may include the container mentioned above. Furthermore, the method and the apparatus may respectively include a discharging step and a discharging device to discharge the curable clear ink composition of the present disclosure. The method of discharging the curable clear ink composition is not particularly limited, and examples thereof include, but are not limited to, a continuous jetting method and an on-demand method. The on-demand method includes a piezo method, a thermal method, an electrostatic method, etc.

Figure 1:
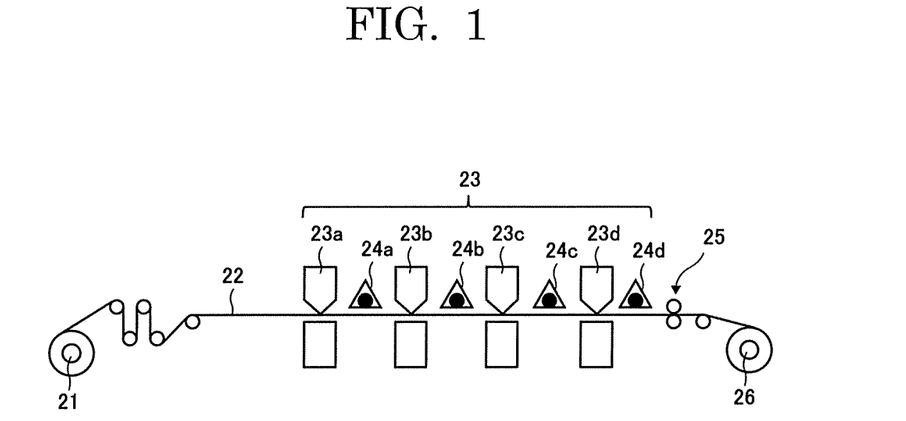
FIG. 1 is a schematic diagram illustrating an image forming apparatus according to an embodiment of the present invention, including an inkjet discharge unit.

FIG. 1 is a diagram illustrating a two-dimensional image forming apparatus equipped with an inkjet discharging device. Printing units 23a, 23b, 23c, and 23d respectively having ink cartridges and discharging heads for yellow, magenta, cyan, and black active energy ray curable inks discharge the inks onto a recording medium 22 fed from a supplying roller 21. Thereafter, light sources 24a, 24b, 24c, and 24d configured to cure the inks emit active energy rays to the inks, thereby curing the inks to form a color image. Thereafter, the recording medium 22 is conveyed to a processing unit 25 and a printed matter reeling roll 26. Each of the printing units 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples thereof include, but are not limited to, paper, film, metal, or composite materials thereof, each of which may be in the form of a sheet. The image forming apparatus may have a one-side printing configuration and/or a two-side printing configuration.

Optionally, multiple colors can be printed with no or weak active energy ray from the light sources 24a, 24b, and 24c followed by irradiation of the active energy ray from the light source 24d. As a result, energy and cost can be saved.

The recorded matter having images printed with the ink used in the present disclosure includes articles having printed images or texts on a plain surface of conventional paper, resin film, etc., a rough surface, or a surface made of various materials such as metal or ceramic. In addition, by laminating layers of images in part or the entire of a recording medium, a partially stereoscopic image (formed of two dimensional part and three-dimensional part) and a three dimensional object can be fabricated.

FIG. 2 is a schematic view illustrating another example of the image forming apparatus (apparatus to fabricate a 3D object) of the present disclosure. An image forming apparatus 39 of FIG. 2 forms a solid object 35 onto a substrate 37 in the following manner. First, a head unit in which inkjet heads are arranged (movable in the directions of A and B) is used to discharge a first curable composition from an ejection head unit 30 for additive manufacturing and to discharge the first curable composition from ejection head units 31 and 32 for support from the ejection head unit 30 for additive manufacturing. Then, active energy rays are emitted from ultraviolet irradiators 33 and 34 to solidify the composition to form a first additive manufacturing layer. The aforementioned step is repeated several times depending on the number of lamination with a stage 38 movable in the vertical direction being lowered to thereby form a supporting layer and an additive manufacturing layer. Thereafter, an additive manufacturing support 36 is removed, if desired. Although only a single ejection head unit 30 for additive manufacturing is provided in FIG. 2, two or more units 30 can be provided.

EXAMPLES

Hereinafter, the present disclosure will be described by way of Examples. However, the present disclosure should not be construed as being limited to these Examples.

Production Examples 1 and 2 of Color Ink

Materials given in Table 1 below were used in the corresponding amounts presented in the table and were mixed together to prepare magenta inks 1 and 2 as color inks.

TABLE 1

| | | Production Example 1 | Production Example 2 |
|---|---|---|---|
| Polymerizable monomer having surface tension of 33 mN/m or less | IBXA | 1 | 1 |
| Polymerizable monomer having surface tension of more than 33 mN/m | ACMO | 7.5 | 7.5 |
| | PEA | 37.3 | 47.3 |
| | CTFA | 17.5 | 17.5 |
| N-vinyl compound | V-CAP | 10 | 0 |
| Polymerization inhibitor | MEHQ | 0.2 | 0.2 |

TABLE 1-continued

| | | Production Example 1 | Production Example 2 |
|---|---|---|---|
| Polymerization initiator | Omnirad TPO | 10 | 10 |
| | DAIDO UV Cure DETX | 1 | 1 |
| Pigment | PR122 | 15 | 15 |
| Dispersant | BYK9151 | 0.5 | 0.5 |
| Total (% by mass) | | 100 | 100 |

Examples 1 to 11 and Comparative Examples 1 to 7

Materials given in Table 2 to Table 5 were sequentially added under stirring, and were stirred for 2 hours to prepare curable clear ink compositions of Examples 1 to 11 and Comparative Examples 1 to 7.

Each of the curable clear ink compositions was printed under printing conditions described in Table 2 to Table 5 to obtain cured materials.

The curable clear ink compositions and the cured materials were evaluated for smoothness of a clear coat layer, hardness, adhesiveness, discharge stability, curing ability, and productivity in the manners described below. Results are presented in Table 2 to Table 5.

<Smoothness of Clear Coat Layer>

Each of the curable clear ink compositions was discharged with a GEN5 head (available from RICOH Company, Ltd.) so that the resultant would have an average thickness of about 20 μm. After a 60-second waiting time from impacting of the ink to irradiation with UV, the ink was irradiated with UV from a UV-LED irradiation machine available from Phoseon to form a clear coat layer. Then, the clear coat layer was visually observed and was evaluated for smoothness based on the following evaluation criteria.

[Evaluation Criteria]

A: No irregularities were visually observed on the clear coat layer, which is not problematic in practical use.

B: Irregularities were visually observed on the clear coat layer, which is however not problematic in practical use.

C: Irregularities were visually observed on the clear coat layer, which is problematic in practical use.

<Hardness>

The cured material was measured for pencil hardness according to the JIS K5600-5-4 scratch hardness (the pencil method) and was evaluated for "hardness" based on the following evaluation criteria.

[Evaluation Criteria]

A: The pencil hardness was H or harder.

B: The pencil hardness was B or harder but F or softer.

C: The pencil hardness was 2B or softer.

<Adhesiveness>

The adhesiveness was measured according to the cross-cut method presented in the JIS K5600-5-6 and was evaluated based on the following evaluation criteria.

[Evaluation Criteria]

A: Rank 0 to 1

B: Rank 2 to 3

C: Rank 4 to 5

<Discharge Stability>

Each of the curable clear ink compositions was continuously discharged at a frequency of 28 kHz for 1 minute using an inkjet discharge device having a GEN5 head (available from RICOH Company, Ltd.) under the conditions that the flying speed of each composition would be 7 m/s±1 m/s. The number of nozzles that did not discharge the composition was counted, and the discharge stability was evaluated based on the following evaluation criteria.

[Evaluation Criteria]

S: The number of nozzles that did not discharge was 0.

A: The number of nozzles that did not discharge was 1 or more but less than 4.

B: The number of nozzles that did not discharge was 4 or more but less than 10.

C: The number of nozzles that did not discharge was 10 or more.

<Curing Ability>

A uniform film of each composition was prepared on a polyethylene terephthalate (PET) film using a wire bar #8 and was irradiated with UV at illuminance of 1 W/cm² using FJ800 (wavelength: 395 nm) available from Phoseon. The integrated light quantity until no tackiness had been felt upon touching the film with fingers was determined, and the hardness was evaluated based on the following evaluation criteria.

[Evaluation Criteria]

A: The integrated light quantity was less than 800 mJ/cm².

B: The integrated light quantity was 800 mJ/cm² or more but less than 1,200 mJ/cm².

C: The integrated light quantity was 1,200 mJ/cm² or more.

<Productivity>

Productivity was evaluated based on the following evaluation criteria from a printing speed at the time when an image having a clear coat layer having an average thickness of 20 μm or more was printed using a printing machine with a GEN5 head (available from RICOH Company, Ltd.) at a discharge frequency of the ink of 28 kHz and a resolution of 600 dpi×600 dpi. Here, the productivity satisfying S, A, and B is a practically applicable level.

[Evaluation Criteria]

S: The printing speed was 12 m²/h or more.

A: The printing speed was 10 m²/h or more but less than 12 m²/h.

B: The printing speed was 7 m²/h or more but less than 10 m²/h.

C: The printing speed was less than 7 m²/h.

TABLE 2

| | | Examples | | | | | |
|---|---|---|---|---|---|---|---|
| | | 1 | 2 | 3 | 4 | 5 | 6 |
| Polymerizable monomer having surface tension of 33 mN/m or less | IBXA | 20 | 10 | 30 | 20 | 20 | 20 |
| Polymerizable monomer having surface tension of more than 33 mN/m | ACMO | 20 | 20 | 20 | 20 | 20 | 20 |
| | PEA | 18.3 | 28.3 | 10.3 | 21.3 | 17.8 | 18.6 |
| | CTFA | 20 | 20 | 20 | 20 | 20 | 20 |
| Oligomer | CN963 | 10 | 10 | 10 | 10 | 10 | 10 |
| Polymerization inhibitor | TBH | | 0.2 | | 0.2 | | 0.2 |
| | MEHQ | 0.2 | | 0.2 | | 0.2 | |
| Polymerization initiaior | Omnirad 819 | 2 | 2 | 2 | 1 | 1.5 | 1 |
| | Omnirad TPO | 9 | 9 | 9 | 7 | 10 | 10 |
| | Omnirad 379 | | | | | | |
| Surfactant | F-556 | 0.5 | | | | | |
| | WET270 | | 0.5 | 0.5 | 0.5 | 0.5 | 0.2 |
| Total (% by mass) | | 100 | 100 | 100 | 100 | 100 | 100 |
| Content of polymerizable monomer having surface tension of 33 mN/m or less (% by mass) | | 20 | 10 | 30 | 20 | 20 | 20 |
| Content of APO-based polymerization initiator (% by mass) | | 11 | 11 | 11 | 8 | 11.5 | 11 |
| Printing conditions | Clear ink droplet size (pL) | 9 | 9 | 9 | 9 | 9 | 9 |
| | Number of times of scanning (number of times) | 10 | 10 | 10 | 10 | 10 | 10 |
| | Leveling time after impact (second) | 140 | 140 | 140 | 140 | 140 | 140 |
| Evaluation results | Smoothness | A | A | A | A | A | A |
| | Hardness | B | B | B | B | B | B |
| | Adhesiveness | A | A | A | A | A | B |
| | Discharge stability | A | A | A | A | A | S |
| | Curing ability | A | A | A | A | A | A |
| | Productivity | B | B | B | B | B | B |

TABLE 3

|  |  | Examples | | | | |
| --- | --- | --- | --- | --- | --- | --- |
|  |  | 7 | 8 | 9 | 10 | 11 |
| Polymerizable monomer having surface tension of 33 mN/m or less | IBXA | 20 | 20 | 20 | 20 | 20 |
| Polymerizable monomer having surface tension of more than 33 mN/m | ACMO | 20 | 20 | 20 | 20 | 20 |
|  | PEA | 20.75 | 18.3 | 18.3 | 18.3 | 18.3 |
|  | CTFA | 20 | 20 | 20 | 20 | 20 |
| Oligomer | CN963 | 10 | 10 | 10 | 10 | 10 |
| Polymerization inhibitor | TBH |  |  |  |  |  |
|  | MEHQ | 0.2 | 0.2 | 0.2 | 0.2 | 0.2 |
| Polymerization initiator | Omnirad 819 | 1 | 2 | 2 | 2 | 2 |
|  | Omnirad TPO | 8 | 9 | 9 | 9 | 9 |
|  | Omnirad 379 |  |  |  |  |  |
| Surfactant | F-556 |  | 0.5 | 0.5 | 0.5 | 0.5 |
|  | WET270 | 0.05 |  |  |  |  |
| Total (% by mass) |  | 100 | 100 | 100 | 100 | 100 |
| Content of polymerizable monomer having surface tension of 33 mN/m or less (% by mass) |  | 20 | 20 | 20 | 20 | 20 |
| Content of APO-based polymerization initiator (% by mass) |  | 9 | 11 | 11 | 11 | 11 |
| Printing conditions | Clear ink droplet size (pL) | 9 | 20 | 10 | 10 | 15 |
|  | Number of times of scanning (number of times) | 10 | 10 | 8 | 8 | 8 |
|  | Leveling time after impact (second) | 140 | 140 | 140 | 15 | 120 |
| Evaluation results | Smoothness | A | B | B | B | A |
|  | Hardness | B | B | B | B | B |
|  | Adhesiveness | A | A | A | A | A |
|  | Discharge stability | S | A | A | A | A |
|  | Curing ability | A | A | A | A | A |
|  | Productivity | B | A | A | S | A |

TABLE 4

|  |  | Comparative Examples | | | | |
| --- | --- | --- | --- | --- | --- | --- |
|  |  | 1 | 2 | 3 | 4 | 5 |
| Polymerizable monomer having surface tension of 33 mN/m or less | IBXA | 20 | 33 | 8 | 20 | 20 |
| Polymerizable monomer having surface tension of more than 33 mN/m | ACMO | 20 | 20 | 20 | 20 | 20 |
|  | PEA | 29.8 |  | 30.3 | 28.3 | 24.3 |
|  | CTFA | 20 | 20 | 20 | 20 | 20 |
| Oligomer | CN963 | 10 | 10 | 10 |  | 10 |
| Polymerization inhibitor | TBH | 0.2 |  | 0.2 |  |  |
|  | MEHQ |  | 0.2 |  | 0.2 | 0.2 |
| Polymerization initiator | Omnirad 819 |  | 2 | 2 | 2 |  |
|  | Omnirad TPO |  | 9 | 9 | 9 | 5 |
|  | Omnirad 379 |  |  |  |  |  |
| Surfactant | F-556 |  |  |  |  |  |
|  | WET270 |  | 0.5 | 0.5 | 0.5 | 0.5 |
| Total (% by mass) |  | 100 | 94.7 | 100 | 100 | 100 |
| Content of polymerizable monomer having surface tension of 33 mN/m or less (% by mass) |  | 20 | 33 | 8 | 20 | 20 |
| Content of APO-based polymerization initiator (% by mass) |  | 0 | 11 | 11 | 11 | 5 |
| Printing conditions | Clear ink droplet size (pL) | 9 | 9 | 9 | 9 | 9 |
|  | Number of times of scanning (number of times) | 10 | 10 | 10 | 10 | 16 |
|  | Leveling time after impact (second) | 140 | 140 | 140 | 140 | 140 |
| Evaluation results | Smoothness | C | A | A | A | A |
|  | Hardness | B | A | B | C | B |
|  | Adhesiveness | A | A | C | A | A |
|  | Discharge stability | A | A | C | A | C |
|  | Curing ability | A | C | A | A | C |
|  | Productivity | B | B | B | B | C |

TABLE 5

|  |  | Comparative Examples | |
|---|---|---|---|
|  |  | 6 | 7 |
| Polymerizable monomer having surface tension of 33 mN/m or less | IBXA | 20 | 20 |
| Polymerizable monomer having surface tension of more than 33 mN/m | ACMO | 20 | 20 |
|  | PEA | 14.3 | 18.3 |
|  | CTFA | 20 | 20 |
| Oligomer | CN963 | 10 | 10 |
| Polymerization inhibitor | TBH | 0.2 |  |
|  | MEHQ |  | 0.2 |
| Polymerization initiator | Omnirad 819 | 3 |  |
|  | Omnirad TPO | 12 |  |
|  | Omnirad 379 |  | 11 |
| Surfactant | F-556 |  |  |
|  | WET270 | 0.5 | 0.5 |
| Total (% by mass) |  | 100 | 100 |
| Content of polymerizable monomer having surface tension of 33 mN/m or less (% by mass) |  | 20 | 20 |
| Content of APO-based polymerization initiator (% by mass) |  | 15 | 0 |
| Printing conditions | Clear ink droplet size (pL) | 9 | 9 |
|  | Number of times of scanning (number of times) | 10 | 10 |
|  | Leveling time after impact (second) | 140 | 140 |
| Evaluation results | Smoothness | A | — |
|  | Hardness | B | — |
|  | Adhesiveness | A | — |
|  | Discharge stability | C | B |
|  | Curing ability | A | C |
|  | Productivity | B | B |

\* In Table 5, the "—" in the "Smoothness", "Hardness", and "Adhesiveness" of Comparative Example 7 means being unmeasurable.

Examples 12 and 13

Materials presented in Table 6 were sequentially added under stirring, and were stirred for 2 hours to prepare curable clear ink compositions of Examples 12 and 13.

As presented in Table 6, the color inks and the curable clear ink compositions were combined to prepare ink sets of Examples 12 and 13.

The ink sets of Examples 12 and 13 were evaluated for smoothness of a clear coat layer, hardness, adhesiveness, discharge stability, curing ability, and productivity in the manners described above. In addition, smoothness of a clear coat layer on a color image formed by using the color ink of the ink set was evaluated in the manner described below. Results are presented in Table 6.

<Smoothness of Clear Coat Layer on Color Image>

A color ink was discharged with a GEN5 head (available from RICOH Company, Ltd.) so that the resultant would have an average thickness of about 10 μm. The discharged color ink was irradiated with UV from a UV-LED irradiation machine available from Phoseon to form a color ink layer. Then, each curable clear ink composition was discharged so that the resultant would have an average thickness of about 20 μm. After a 60-second waiting time from impacting of the ink to irradiation with UV, the ink was irradiated with UV from a UV-LED irradiation machine available from Phoseon to form a clear coat layer. The clear coat layer was visually observed and was evaluated for smoothness of the clear coat layer on the color image based on the following evaluation criteria.

[Evaluation Criteria]

A: No irregularities were visually observed on the clear coat layer, which is not problematic in practical use.

B: Irregularities were visually observed on the clear coat layer, which is however not problematic in practical use.

TABLE 6

|  |  | Example | |
|---|---|---|---|
|  |  | 12 | 13 |
| Color ink |  | Production Example 1 | Production Example 2 |
| Polymerizable monomer having surface tension of 33 mN/m or less | IBXA | 20 | 20 |
| Polymerizable monomer having surface tension of more than 33 mN/m | ACMO | 20 | 20 |
|  | PEA | 18.3 | 18.3 |
|  | CTFA | 20 | 20 |
| Oligomer | CN963 | 10 | 10 |
| Polymerization inhibitor | TBH |  |  |
|  | MEHQ | 0.2 | 0.2 |
| Polymerization initiator | Omnirad 819 | 2 | 2 |
|  | Omnirad TPO | 9 | 9 |
|  | Omnirad 379 |  |  |
| Surfactant | F-556 | 0.5 | 0.5 |
|  | WET270 |  |  |
| Total (% by mass) |  | 100 | 100 |
| Content of plymerizable monomer having surface tension of 33 mN/m or less (% by mass) |  | 20 | 20 |
| Content of APO-based polymerization initiator (% by mass) |  | 11 | 11 |
| Printing conditions | Clear ink droplet size (pL) | 15 | 15 |
|  | Number of times of scanning (number of times) | 8 | 8 |
|  | Leveling time after impact (second) | 120 | 120 |
| Evaluation results | Smoothness | A | A |
|  | Hardness | B | B |
|  | Adhesiveness | A | A |
|  | Discharge stability | A | A |
|  | Curing ability | A | A |
|  | Productivity | A | A |
|  | Smoothness of clear coat layer on color image | B | A |

Details of the materials used in Production Examples of the color inks, Examples, and Comparative Examples in Table 1 to Table 6 are as follows.

—Monofunctional Polymerizable Compound Having Static Surface Tension of 33 mN/m or less at 25 degrees C.—

Isobornyl acrylate (available from Osaka Organic Chemical Industry Ltd., "IBXA", static surface tension at 25 degrees C.: 33 mN/m)

—Monofunctional Polymerizable Compound Having Static Surface Tension of more than 33 mN/m at 25 degrees C.—

Acryloyl morpholine (available from KJ Chemicals Corporation, "ACMO", static surface tension at 25 degrees C.: 44 mN/m)

Phenoxyethyl acrylate (available from Osaka Organic Chemical Industry Ltd., "PEA", static surface tension at 25 degrees C.: 40 mN/m)

Cyclic trimethylolpropane formal acrylate (available from Osaka Organic Chemical Industry Ltd., "CTFA", static surface tension at 25 degrees C.: 36 mN/m)

—Oligomer—

CN963 (urethane acrylate oligomer, available from SARTOMER, weight average molecular weight (Mw)=1,400)

—Polymerization Inhibitor—

TBH (tert-butylhydroquinone, available from Tokyo Chemical Industry Co., Ltd.)

MEHQ (4-methoxyphenol: Metoquinone, available from Seiko Chemical CO., Ltd.)

—Acylphosphine Oxide Polymerization Initiator—

Omnirad 819 (phenylbis(2,4,6-trimethylbenzoyl)phosphine oxide, available from IGM)

Omnirad TPO (2,4,6-trimethylbenzoyl-diphenyl phosphine oxide, available from IGM)

—Polymerization Initiator Other Than Acylphosphine Oxide—

Omnirad 379 (available from IGM)

DAIDO UV Cure DETX (available from Daido Chemical Corporation)

—Surfactant—

F-556 (fluorine-based surfactant, available from DIC Corporation)

TEGO WET270 (polyether-modified siloxane copolymer, available from Evonik Japan)

—N-Vinyl Compound—

V-CAP (available from Ashland)

—Pigment—

Pigment Red 122 ("Hostaperm" pink EBtransp., available from Clariant)

—Dispersant—

BYK9151 (available from BYK)

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A curable clear ink composition comprising:
   a surfactant, wherein the surfactant is free of a polymerizable reactive group;
   from 10% to 30% by mass of a monofunctional polymerizable compound having a static surface tension of 25 to 33 mN/m at 25° C.;
   from 50% to 70% by mass of a monofunctional polymerizable compound having a static surface tension of more than 33 mN/m at 25° C.;
   an oligomer having a weight average molecular weight (Mw) of at least 1,000; and
   from 8% to 12% by mass of an acylphosphine oxide polymerization initiator, wherein said curable clear ink composition is substantially free of a colorant.

2. The curable clear ink composition according to claim 1, wherein the surfactant is a polysiloxane surfactant.

3. The curable clear ink composition according to claim 1, wherein the monofunctional polymerizable compound having a static surface tension of 25 to 33 mN/m at 25° C. is at least one selected from the group consisting of isobornyl (meth)acrylate, lauryl (meth)acrylate, isodecyl (meth)acrylate, isooctyl (meth)acrylate, n-decyl (meth)acrylate, n-octyl (meth)acrylate, isobutyl (meth)acrylate, octyl/decyl (meth)acrylate and isononyl (meth)acrylate.

4. The curable clear ink composition according to claim 3, wherein the monofunctional polymerizable compound having a static surface tension of 25 to 33 mN/m at 25° C. is isobornyl (meth)acrylate.

5. The curable clear ink composition according to claim 1, wherein the curable clear ink composition is an active energy ray curable clear ink composition.

6. The curable clear ink composition according to claim 1, wherein the curable clear ink composition is for inkjet.

7. A storing container comprising:
   the curable clear ink composition according to claim 1; and
   a container,
   the curable clear ink composition being stored in the container.

8. An ink set comprising:
   a clear ink comprising the curable clear ink composition according to claim 1; and
   a color ink.

9. The ink set according to claim 8, wherein the color ink is substantially free of an N-vinyl compound and a surfactant.

10. A printing method comprising discharging the curable clear ink composition according to claim 1 in a droplet size of 10 pL, or more but 20 pL: or less to print an image.

11. The printing method according to claim 10, wherein the discharging is performed on same part of the image to be printed with number of times of scanning being 8 times or less.

12. The printing method according to claim 10, wherein a leveling time from when the curable clear ink composition is impacted on a substrate to when the curable clear ink composition is irradiated with active energy rays is 15 seconds or more but 120 seconds or less.

13. A printed matter, which is obtained through printing by the printing method according to claim 10.

14. A cured material, which is formed using the curable clear ink composition according to claim 1.

15. The curable clear ink composition according to claim 1, wherein a proportion of the surfactant in the curable clear ink composition is from 0.05% by mass to 0.2% by mass.

16. A curable clear ink composition comprising:
   a surfactant, wherein the surfactant is free of a polymerizable reactive group;
   from 10 to 30% by mass of a monofunctional polymerizable compound having a static surface tension of 25 to 33 mN/m at 25° C.;
   an oligomer having a weight average molecular weight (Mw) of at least 1,000; and
   from 8% to 12% by mass of an acylphosphine oxide polymerization initiator comprising bis(2,4,6-trimethylbenzoyl)phenylphosphine oxide in an amount of no more than 18.18 wt. % of the polymerization initiator, wherein said curable clear ink composition is substantially free of a colorant.

17. The curable clear ink composition according to claim 16, comprising bis(2,4,6-trimethylbenzoyl)phenylphosphine oxide in an amount of no more than 11.11 wt. % of the polymerization initiator.

* * * * *